US008358710B2

(12) United States Patent
Adachi (10) Patent No.: US 8,358,710 B2
(45) Date of Patent: *Jan. 22, 2013

(54) OFDM RECEIVER, INTERFERENCE WAVE DISCERNMENT METHOD, WINDOW CONTROL APPARATUS AND WINDOW CONTROL METHOD

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1416 days.

This patent is subject to a terminal disclaimer.

(21) Appl. No.: 11/554,869

(22) Filed: Oct. 31, 2006

(65) Prior Publication Data

US 2007/0280364 A1 Dec. 6, 2007

(30) Foreign Application Priority Data

May 31, 2006 (JP) .................. 2006-152530

(51) Int. Cl.
*H04L 27/28* (2006.01)
(52) U.S. Cl. ......... 375/260; 375/316; 370/203; 370/208
(58) Field of Classification Search .................. 375/344, 375/355, 343, 260, 316; 370/203, 208
See application file for complete search history.

(56) References Cited

U.S. PATENT DOCUMENTS

| 2006/0153317 A1* | 7/2006 | Zhang et al. | 375/344 |
| 2006/0198472 A1* | 9/2006 | Nakamura et al. | 375/343 |
| 2007/0053473 A1* | 3/2007 | Palin | 375/355 |

FOREIGN PATENT DOCUMENTS

| EP | 1441484 A2 | 7/2004 |
| JP | 2001-345775 | 12/2001 |
| JP | 2003-110519 | 4/2003 |
| JP | 2004-179816 | 6/2004 |
| JP | 2004-228853 | 8/2004 |
| JP | 2004-336279 | 11/2004 |
| KR | 10-2006-0016702 | 2/2006 |
| WO | 2006/019271 A1 | 2/2006 |

OTHER PUBLICATIONS

Korean Patent Office Action, mailed Oct. 24, 2007 and issued in corresponding Korean Patent Application No. 10-2006-0116336.
Office Action issued in corresponding Korean Patent Application No. 10-2006-0116336; mailed May 30, 2008.
Japanese Office Action issued Mar. 1, 2011 in corresponding Japanese Patent Application 2006-152530.
Japanese Office Action issued May 24, 2011 in corresponding Japanese Patent Application 2006-152530.
Chinese Office Action issued Oct. 16, 2009 in corresponding Chinese Patent Application 200610145222.8.

* cited by examiner

*Primary Examiner* — Sam K Ahn
*Assistant Examiner* — Leila Malek
(74) *Attorney, Agent, or Firm* — Staas & Halsey LLP

(57) ABSTRACT

An OFDM receiver according to the present invention judges whether or not a delay amount (i.e., a first delay amount) of a transmission path detected from scattered pilot information existing in an OFDM signal of a frequency domain by referring to peak position information obtainable from OFDM signals of the preceding and following symbols, calculates another delay amount (i.e., a second delay amount) from the delay amount (i.e., the first delay amount) if the aforementioned delay amount is judged to be inappropriate, and set a position of a time window by using the calculated delay amount.

15 Claims, 9 Drawing Sheets

OFDM RECEIVER, INTERFERENCE WAVE DISCERNMENT METHOD, WINDOW CONTROL APPARATUS AND WINDOW CONTROL METHOD

CROSS-REFERENCE TO RELATED APPLICATIONS

This application is based upon and claims the benefit of priority from the prior Japanese Patent Application No. 2006-152530 filed on May 31, 2006, the entire contents of which are incorporated herein by reference.

BACKGROUND OF THE INVENTION

1. Field of the Invention

The present invention relates to a technique for receiving an Orthogonal Frequency Division Multiplexing (OFDM) signal transmitted by an OFDM system and demodulating it adequately.

2. Description of the Related Art

As a system for transmitting data, proposed in recent years is a transmission system called an Orthogonal Frequency Division Multiplexing (OFDM) system. The OFDM system transmit data by allocating data to plural carriers (i.e., sub-carriers), respectively, which are perpendicular on the frequency axis. A modulation and a demodulation commonly use an inverse fast Fourier transform (IFFT) and a fast Fourier transform (FFT), respectively. The FFT is applied in a width of a time window (i.e., an FFT window). Since frequency usage efficiency is high at the OFDM system, an application to a digital terrestrial broadcasting is widely considered and adopted by the Integrated Services Digital Broadcasting-Terrestrial (ISDB-T), that is, the terrestrial digital broadcasting of Japan.

In the conventional digital modulation system using a single carrier, modulation of a signal is difficult under a condition (i.e., a multi-path environment) where a multi-path occurs (i.e., a reception side receiving the same radio wave by way of a plurality of paths as a result of the radio wave transmitted from the base station or broadcasting station being reflected by obstacle(s) such as building(s) in a mobile phone service or a television broadcast), because a symbol period becomes shorter with a speed of transmission. Accordingly, the OFDM system employs a multi-carrier transmission system which transmits by dividing/allocating information into a plurality of carriers, in lieu of using a single carrier. The transmission of divided data by a plurality of carriers makes it possible to make a symbol length long for each of the carriers, thereby enabling a response to a multi-path with a long delay. And it is possible to use different modulation system for each carrier because data are respectively allocated to plural carriers.

Figure 4:
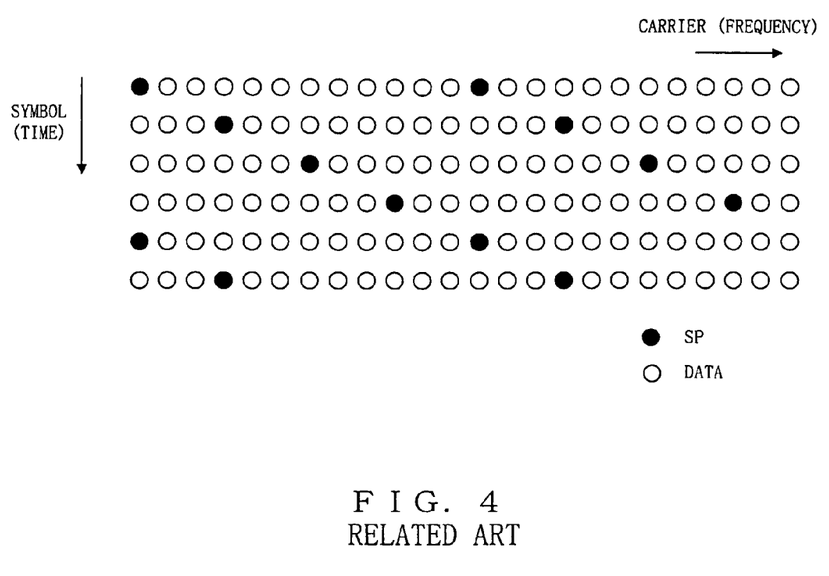
FIG. 4 shows a format of an OFDM signal.

FIG. 4 shows a format of an OFDM signal. Referring to FIG. 4, carriers (i.e., sub-carriers) modulated in a time/frequency domain are indicated by circles. Solid black circles among those circles indicate carriers which are placed with Scattered Pilot (SP) information (which is called as "SP carrier" hereinafter), while white circles indicate carriers placed with data. As shown in FIG. 4, the SP information is placed one in twelve carriers in the frequency axis direction, while one in four symbols in the time axis direction.

The OFDM system is reinforced against a multi-path by adding the end part of a symbol to the beginning thereof. The added signal is called a guard interval.

For a radio wave received in a multi-path environment, a radio wave of the maximum power is called a principal wave, one received with a delay from the principal wave is called a delayed wave, and one received in advance of the principal wave is called an advanced wave. The principal wave is a radio wave usually received directly, that is, one free of a reflection, et cetera, by an obstacle. The delayed wave is also generated by a diffraction or scatter in addition to a reflection by an obstacle. Radio waves causing a hindrance to a demodulation are generally called an interference wave.

Figure 1A:
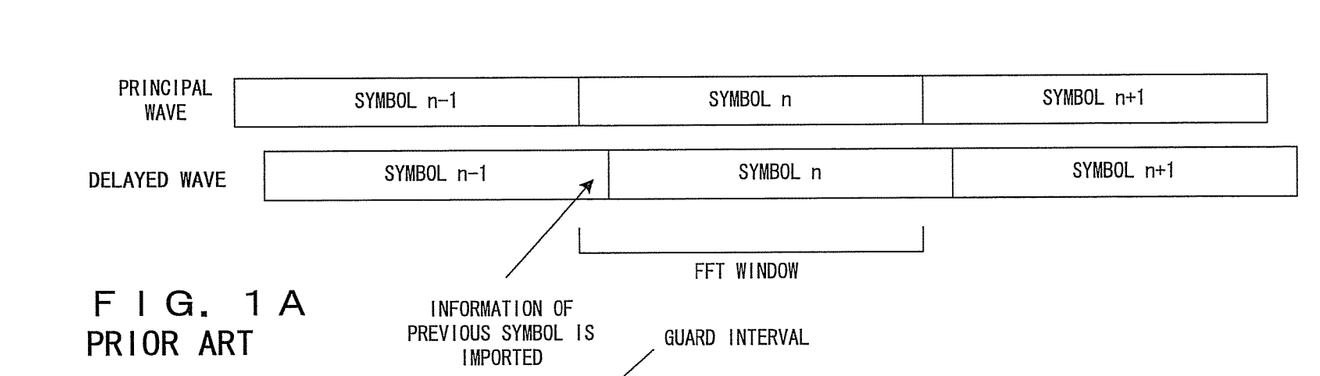
FIG. 1A shows correspondence of symbols between a principal wave and a delayed wave in the case of a guard interval being nonexistent.
Figure 1B:
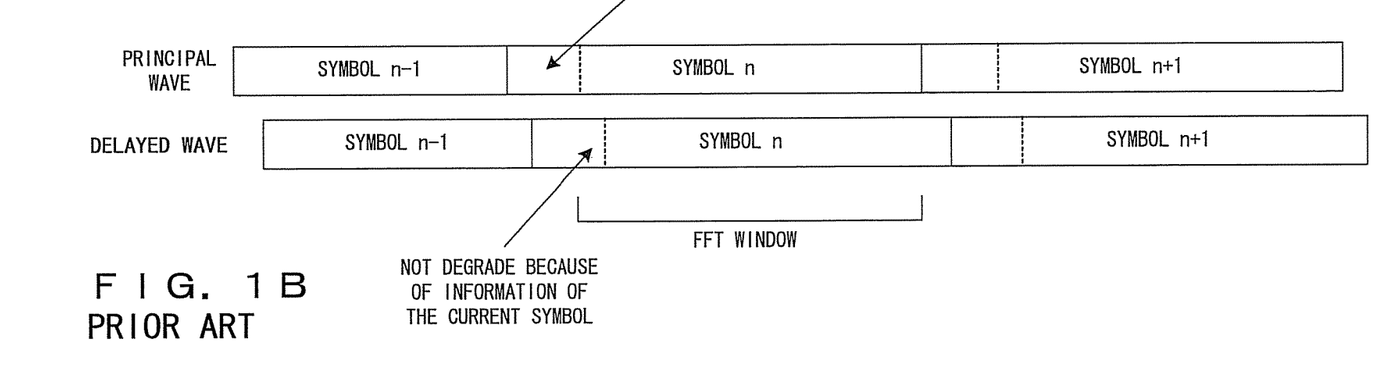
FIG. 1B shows correspondence of symbols between a principal wave and a delayed wave in the case of a guard interval being existent.

FIGS. 1A and 1B show an effect of a guard interval. These diagrams show relationship of symbols between the principal wave and delayed wave in the cases of the guard interval being present, i.e., FIG. 1A, and of the one being not present, i.e., FIG. 1B. Note that "n−1", "n" and "n+1" respectively noted in FIGS. 1A and 1B indicate the sequence of the symbols being transmitted. This description method is the same hereinafter.

An FFT is performed in the range specified by an FFT window as the target. Because of it, the symbol n−1 of a delayed wave is imported when applying the FFT to the symbol n of a principal wave if there is no guard interval as shown in FIG. 1A, thus resulting in generating an interference between symbols in the front and back. Comparably, if there is a guard interval, a demodulation is possible without generating such interference between symbols because a symbol n−1 positioned immediately in front is not imported as shown in FIG. 1B.

A position of the FFT window is controlled by matching with the position of a symbol which is to be the target in order to perform a demodulation appropriately. The position of the FFT window is matched with the position of a symbol of the principal wave by the aforementioned control (i.e., the FFT window control) under the condition of a delayed wave in existence. The reason is that a guard interval is added in front of a symbol. Under the condition of an advanced wave in existence in place of a delayed wave, however, the next symbol of the advanced wave overlaps in the range of a symbol of the principal wave existing (refer to FIG. 2A). Consequently, if the position of the FFT window is matched with the position of a symbol of the principal wave, a demodulation becomes impossible as a result of generating interference between the symbols. Because of this, under the condition of an advanced wave in existence, an FFT window control is carried out as follows, which is now specifically described by referring to FIGS. 2A and 2B.

Figure 2A:
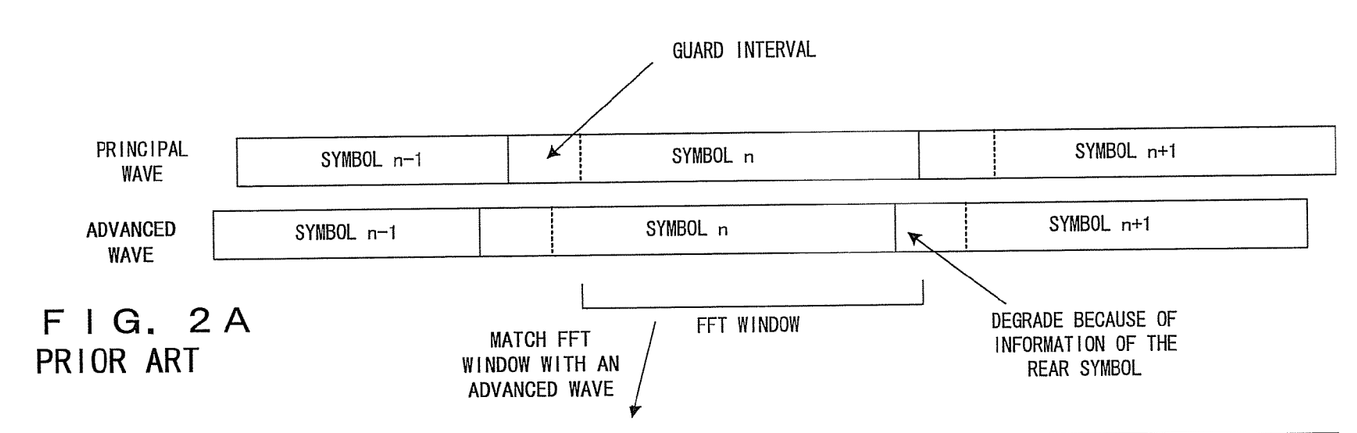
FIG. 2A shows an incorrectly performing FFT window control in the case of an advanced wave being existent.
Figure 2B:
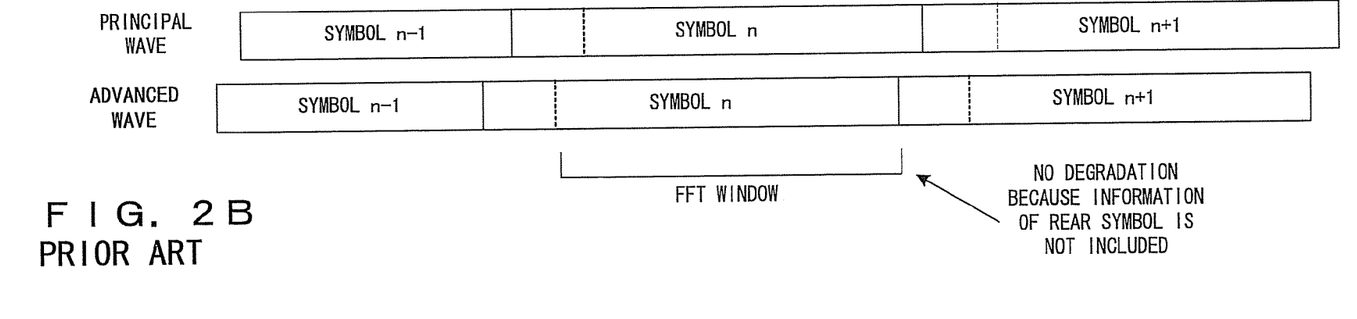
FIG. 2B shows a correctly performing FFT window control in the case of an advanced wave being existent.

FIGS. 2A and 2B show an FFT window control performed in the case of an advanced wave in existence, with FIG. 2A showing the case of controlling the FFT window incorrectly and FIG. 2B showing the case of controlling it correctly.

As shown in FIG. 2A, if the position of the FFT window is matched with the symbol n of the principal wave in the same manner as in the case of the delayed wave, the symbol n+1 of the advanced wave is imported when performing an FFT of the symbol n, the correct demodulation cannot be carried out as a result of generating interference between the symbols. Comparably, if the position of the FFT window is matched with the symbol n of the advanced wave, the range of the FFT window is now the data of the symbol n for both the principal wave and advanced wave as shown in FIG. 2B, and therefore it is possible to demodulate correctly.

It is possible to demodulate correctly in a multi-path environment under which an FFT window is within a guard interval length by performing an FFT window control as described above. Therefore, a Single Frequency Network (SFN) broadcast is enabled. The SFN broadcast carries out a simultaneous broadcast at a plurality of stations by relaying and transmitting the same program on the same frequency (i.e., channel).

This creates a multi-path environment; the adoption of the OFDM system accomplishes it, however.

Figure 3:
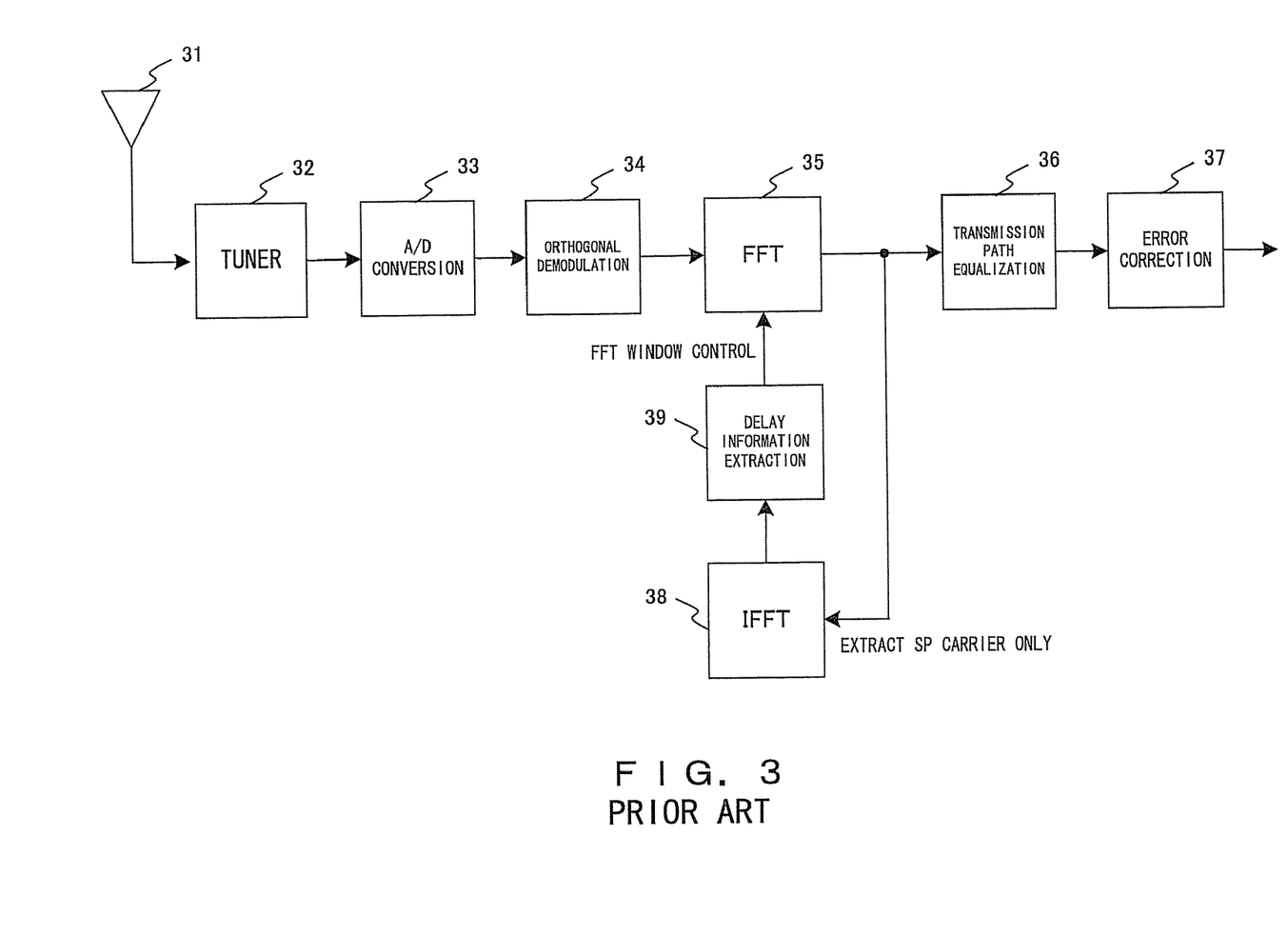
FIG. 3 shows a configuration of a conventional OFDM receiver.

FIG. 3 shows a configuration of a conventional OFDM receiver. A specific description at this point is of the conventional OFDM receiver by referring to FIG. 3.

The OFDM receiver, premising a digital terrestrial broadcasting for example, comprises an antenna 31, a tuner 32, an analog-to-digital (A/D) converter 33, an orthogonal demodulation unit 34, an FFT unit 35, a transmission path equalization unit 36, an error correction unit 37, an IFFT unit 38 and a delay information extraction unit 39.

The next description is of an operation thereof.

An OFDM signal received at the antenna 31 is input to the tuner 32, and only the OFDM signal selected by the tuner 32 is input to the A/D converter 33 to be digitized. The digitized OFDM signal is input to the orthogonal demodulation unit 34 to be applied by an orthogonal demodulation, thereby generating a baseband OFDM signal. The FFT unit 35 receives an input of the OFDM signal, performs an FFT by extracting a part specified by the FFT window and converts a time domain signal into a signal of a frequency domain. The transmission path equalization unit 36 estimates a transmission path and removes the influences of a noise and of a waveform distortion from the OFDM signal converted into a frequency domain. The error correction unit 37 performs an error correction of a post-compensation OFDM signal as s target after the aforementioned removal. This correction is carried out by using an error correction sign added to the OFDM signal. The post-correction OFDM signal is output as the final demodulation signal.

The IFFT unit 38 performs an IFFT by extracting a part worth an SP carrier from within the OFDM signal output from the FFT unit 35 and reverts it back to a time domain signal. The delay information extraction unit 39 detects a delay time of a transmission path (i.e., delay information) from the time domain signal of an SP carrier and performs an FFT window control by setting the position of the FFT window according to the delay time. The FFT unit 35 performs an FFT according to the position of the FFT window set by the window control.

As described above, the addition of a guard interval makes it possible to correspond to a delayed wave or advanced wave within the length of the guard interval. In the above noted SFN broadcast, there is a region where an interference wave exceeds the allowable range of the guard interval. In such a region, a generated interference causes to fail an appropriate demodulation.

Depending on a modulation system adopted by the OFDM system, it is possible to receive even if there is a certain degree of degradation by adequately matching the position of the FFT window. This makes a right matching of the position of the FFT window very important also in a multi-path environment where a multi-path exceeds the allowable range of the guard interval.

The conventional OFDM receiver shown by FIG. 3 detects delay information of a transmission path from an SP carrier and performs an FFT window control. The SP carrier is placed within an OFDM signal as shown in FIG. 4. By this, the SP carrier is usable in a three-carrier interval on the time axis and therefore a detectable range of the delay information is up to one third (⅓) symbol length. One symbol length in the case of the mode 3 of the ISDB-T is 1.008 milliseconds. Therefore the range is up to 336 (=1000/3) microsec. Considering both of the delay and advanced waves, it is up to ±⅙ symbol length. In the case of ISDB-T, mode 3, the limit is ±168 microsec.

From the above noted considerations, assuming there is a 200-microsec advanced wave, the detection limit is ±168 microsec for an FFT window control by the SP carrier, and therefore the 200-microsec advanced wave results in being regarded as a 136-microsec delayed wave in terms of its characteristic.

In the case of the mode 3 with a guard interval length being ⅛ symbol, which is common for the ISDB-T, the guard interval length is 126 microsec. The conventional FFT window control by the SP carrier is capable of performing it correctly in a multi-path environment within the guard interval length. As described above, however, such a conventional FFT window control can actually hardly perform correctly in a multi-path environment exceeding the guard interval length. Therefore, it is conceivably very important to have a capability of carrying out an FFT window control also in an environment containing an interference wave (i.e., a delayed wave or advanced wave) exceeding a range detectable by the SP carrier.

Reference technical documents include Laid-Open Japanese Patent Application Publication Nos. 2001-345775, 2003-110519, 2004-228853 and 2004-336279.

SUMMARY OF THE INVENTION

In consideration of the situation as described above, the purpose of the present invention is to provide a technique enabling a correct FFT window control even in an environment containing an interference wave (i.e., a delayed wave or advanced wave) exceeding a range detectable by an SP carrier.

According to the present invention, an Orthogonal Frequency Division Multiplexing (OFDM) receiver, premising a reception of an OFDM signal transmitted by the OFDM system, comprises a Fourier transform circuit for performing a Fourier transform on an OFDM signal which has been received and applied by an orthogonal demodulation and outputting an OFDM signal of a frequency domain; a delay amount detection unit for detecting a first delay amount of a transmission path from a scattered pilot information existing in an OFDM signal of the frequency domain; and a window control unit for judging whether or not the first delay amount detected by the delay amount detection unit is appropriate based on at least either of the OFDM signal of the frequency domain transformed by the Fourier transform circuit, or peak position information obtained from OFDM signals of the preceding and following symbols, calculating a second delay amount if the first delay amount is judged to be inappropriate, and setting a position of a time window indicating a range to be performed on by a Fourier transform within the OFDM signal by the Fourier transform circuit by using either of the first or second delay amount.

Note that the above noted judgment of whether or not said delay amount is appropriate is preferably made if an absolute value of said first delay amount is on the outside of a predefined range. And that a transform result by said Fourier transform circuit preferably includes Modulation Error Rate (MER) information from a transmission equalization unit connected to the Fourier transform circuit and Bit Error Rate (BER) information from an error correction unit connected to the transmission equalization unit.

A window control apparatus according to the present invention, premising an equipment on an Orthogonal Frequency Division Multiplexing (OFDM) receiver, which receives an OFDM signal transmitted by an OFDM system, in order to control a position of a time window indicating a part constituting a target of a Fourier transform within an OFDM signal which has been received and applied by an orthogonal demodulation, comprises a delay information obtainment unit for obtaining first delay information indicating a delay amount of a transmission path which is detected from scattered pilot information existing in an OFDM signal of a frequency domain; a position information obtainment unit for at least obtaining peak position information obtainable from OFDM signals of the preceding and following symbols; and a window control unit for judging whether or not the first delay information obtained by the delay information obtainment unit is appropriate based on peak position information obtained by the position information obtainment unit, calculating a second delay amount if the first delay information is judged to be inappropriate, and setting a position of a time window indicating a range to be performed on by a Fourier transform within the OFDM signal by using either of the first or second delay information.

Note that the above noted judgment of whether or not said delay amount is appropriate is preferably made if an absolute value of said first delay amount is on the outside of a predefined range. And that the window control unit is preferably configured to judge whether or not said first delay information is appropriate based on three kinds of information, i.e., peak position information obtained by said position information obtainment unit, Modulation Error Rate (MER) information from a transmission path equalization unit connected to said Fourier transform circuit and Bit Error Rate (BER) information from a correction unit connected to the transmission path equalization unit, and calculate said second delay information if the delay information is judged to be inappropriate.

A window control method according to the present invention, which is a method for use in an Orthogonal Frequency Division Multiplexing (OFDM) receiver that receives an OFDM signal transmitted by an OFDM system, for controlling a position of a time window indicating a part constituting a target of a Fourier transform within an OFDM signal which has been received and applied by an orthogonal demodulation, comprises: obtaining first delay information indicating a delay amount of a transmission path detected from scattered pilot information existing in an OFDM signal of a frequency domain; at least obtaining peak position information obtainable from OFDM signals of the preceding and following symbols; judging whether or not the first delay information is appropriate based on the peak position information, and calculating a second delay information if the first delay information is judged to be inappropriate; and setting a position of a time window indicating a range to be performed by the Fourier transform within the OFDM signal by using either one of the first delay information or second delay information.

The present invention is contrived to refer to peak position information obtainable from OFDM signals of the preceding and following symbols, judge whether or not a delay amount (i.e., a first delay amount) of a transmission path detected from scattered pilot information existing in an OFDM signal of a frequency domain is appropriate, calculate another delay amount (i.e., a second delay amount) from the delay amount (i.e., the first delay amount) if it is judged to be inappropriate, and set a position of a time window by using the calculated delay amount.

In the detection of a delay amount, by the scattered pilot information, there is a possibility of an erroneous recognition of an advanced wave as delayed wave, or of an erroneous recognition of a delayed wave as advanced wave. A form indicated by the peak position information changes depending on an interference wave being an advanced wave or delayed wave. Therefore, it is possible to discern whether the interference wave is an advanced wave or delayed wave by referring to the peak position information, and therefore it is possible to confirm whether or not a delay amount detected from the scattered pilot information is correct by using the discernment result. Accordingly, the reflection of the confirmation result to a setup of a position of a time window, that is, to a time (FFT) window control makes it possible to eliminate an effect of the erroneous recognition, and carry out a demodulation always appropriately.

DESCRIPTION OF THE PREFERRED EMBODIMENTS

The following is a detailed description of the preferred embodiment of the present invention by referring to the accompanying drawings.

Figure 5:
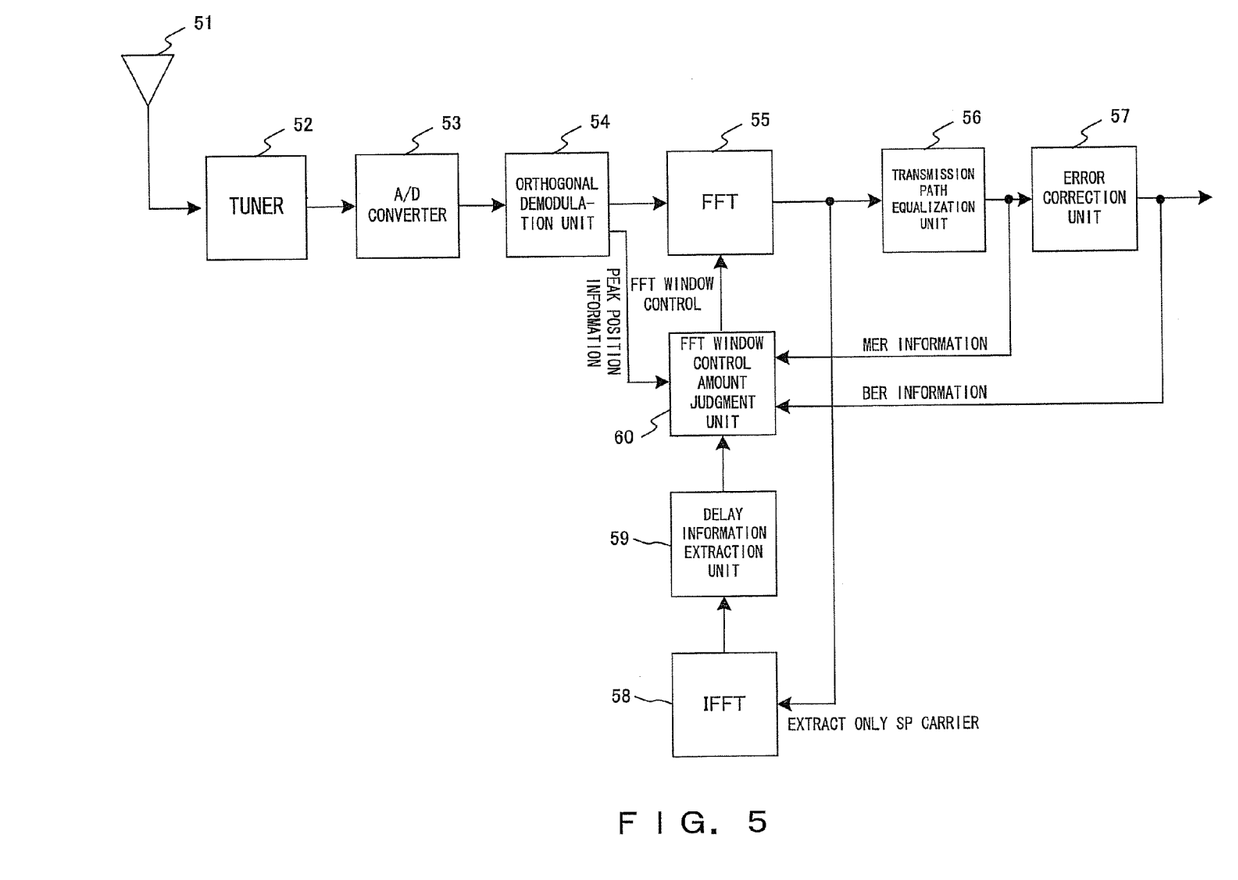
FIG. 5 shows a structure of an OFDM receiver according to the present embodiment.

FIG. 5 shows a structure of an OFDM receiver according to the present embodiment. The OFDM receiver, assuming a digital terrestrial broadcasting, comprises an antenna 51, a tuner 52, an A/D converter 53, an orthogonal demodulation unit 54, an FFT unit (i.e., Fourier transform circuit) 55, a transmission path equalization unit 56, an error correction unit 57, an IFFT unit 58, a delay information extraction unit 59 and an FFT window control amount judgment unit 60. A window control apparatus according to the present embodiment is accomplished as the FFT window control amount judgment unit 60.

The next description is of an operation thereof.

An ODFM signal received at the antenna 51 is input to the tuner 52, only an OFDM signal selected thereby is input to the A/D converter 53 and is digitized therein. The digitized OFDM signal is then input to the orthogonal demodulation unit 54 and is orthogonally demodulated therein, thereby a baseband OFDM signal being generated. The FFT unit 55 receives the input OFDM signal and performs an FFT by extracting a part designated by an FFT window, thereby transforming a time domain signal into a frequency domain signal. By this transform, the received OFDM signal is demodulated.

The transmission path equalization unit 56 estimates a transmission path for each carrier and removes the influence of noise or of a waveform distortion from the OFDM signal transformed to a frequency domain. The error correction unit 57 performs an error correction for the post-compensation OFDM signal, as a target, by such a removal. The correction is carried out by using a correction sign added to the OFDM signal. The post-correction OFDM signal is output as the final demodulation signal.

The IFFT unit 58 extracts only a part worth an SP carrier from the OFDM signal output from the FFT unit 55, performs an IFFT on the part and reverts it back to a time domain signal. The delay information extraction unit 59 detects a delay time (i.e., delay information) of a transmission path from the signal of the time domain of the SP carrier. The FFT window control amount judgment unit 60 inputs the delay information from the delay information extraction unit 59 and performs an FFT window control by using the delay information. It also confirms whether or not the delay information is appropriate on an as required basis and, if it confirms inappropriateness, then generates delay information different from the present delay information and performs an FFT window control by using the generated delay information. It obtains peak position information from the orthogonal demodulation unit 54, Modulation Error Rate (MER) information from the transmission path equalization unit 56, Bit Error Rate (BER) information from the error correction unit 57 in order to confirm whether or not the delay information input from the delay information extraction unit 59 is appropriate.

Figure 7:
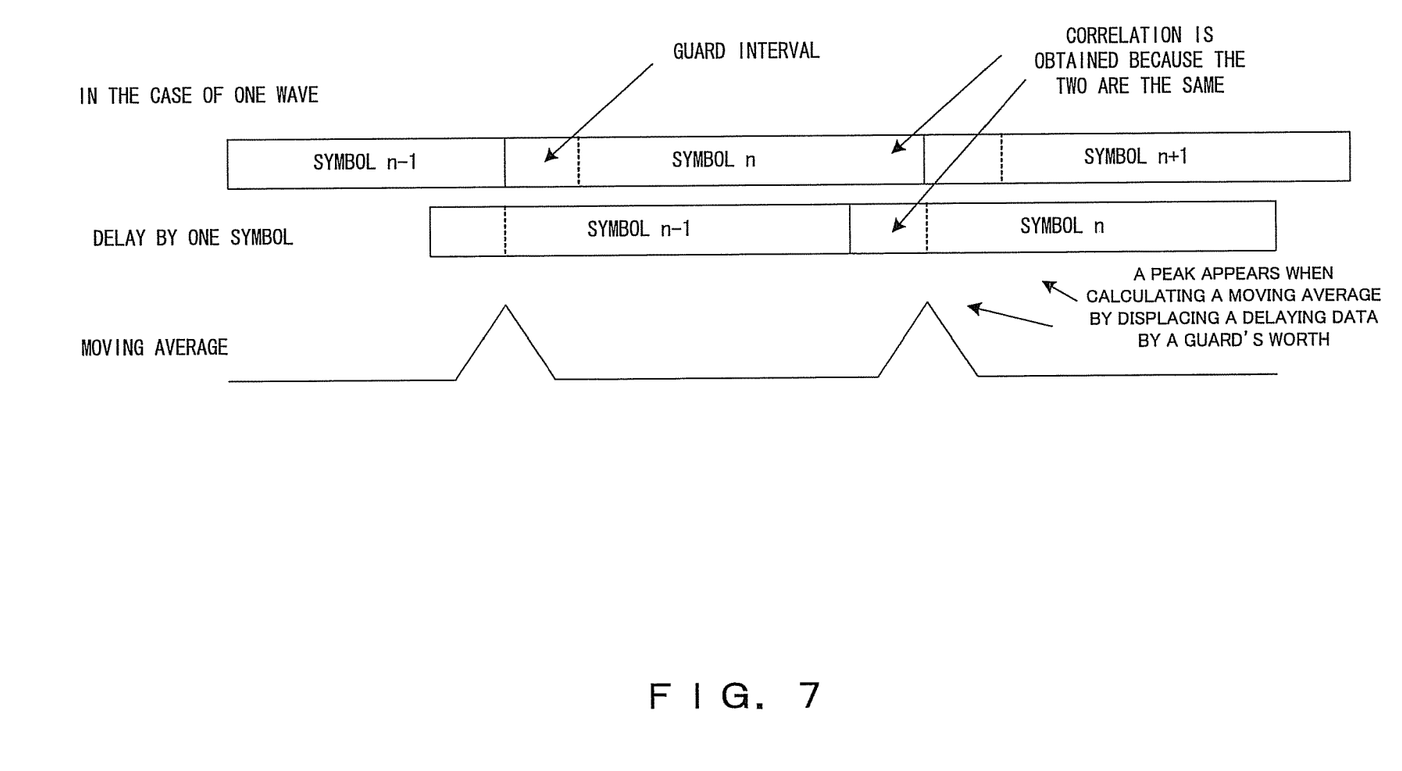
FIG. 7 shows peak position information.

FIG. 7 is a diagram describing peak position information.

The peak position information is one commonly used for detecting a reasonable position of an FFT window by taking advantage of the information being attached to a guard interval in the OFDM system. As shown in FIG. 7, it is generated by calculating a correlation between the currently targeted symbol (i.e., the current symbol) and the immediately preceding symbol and calculating the moving average. The calculated value of the correlation becomes a nonzero value between the same symbols and therefore the moving average results in having peaks as shown in FIG. 7.

The orthogonal demodulation unit 54 comprises memory for storing an OFDM signal of the preceding symbol and generates peak position information by using the memory. The peak position information is used for correcting a carrier frequency error and a sampling frequency error between a transmitter and a receiver.

The transmission path equalization unit 56 estimates a transmission path for each carrier and removes the influences of noise and of a waveform distortion from the OFDM signal. The MER information is one indicating a degree of the influence. The BER information is one indicating a ratio of data which have not been correctly demodulated among the modulated.

The MER information and BER information are ones indicating a state of the demodulated OFDM signal by an FFT process, and are therefore used for judging whether or not the position of an FFT window is appropriate. The FFT window control amount judgment unit 60 refers to the peak position information, MER information and BER information, and judges whether or not the delay information extracted by the delay information extraction unit 59 is appropriate. If the delay information is judged to be inappropriate, it generates new delay information which is deemed to be appropriate and performs an FFT window control by using the generated delay information. Here, the delay information extracted by the delay information extraction unit 59 and the newly generated delay information are hereinafter noted as "first delay information" and "second delay information", respectively, for avoiding confusion.

Figure 6:
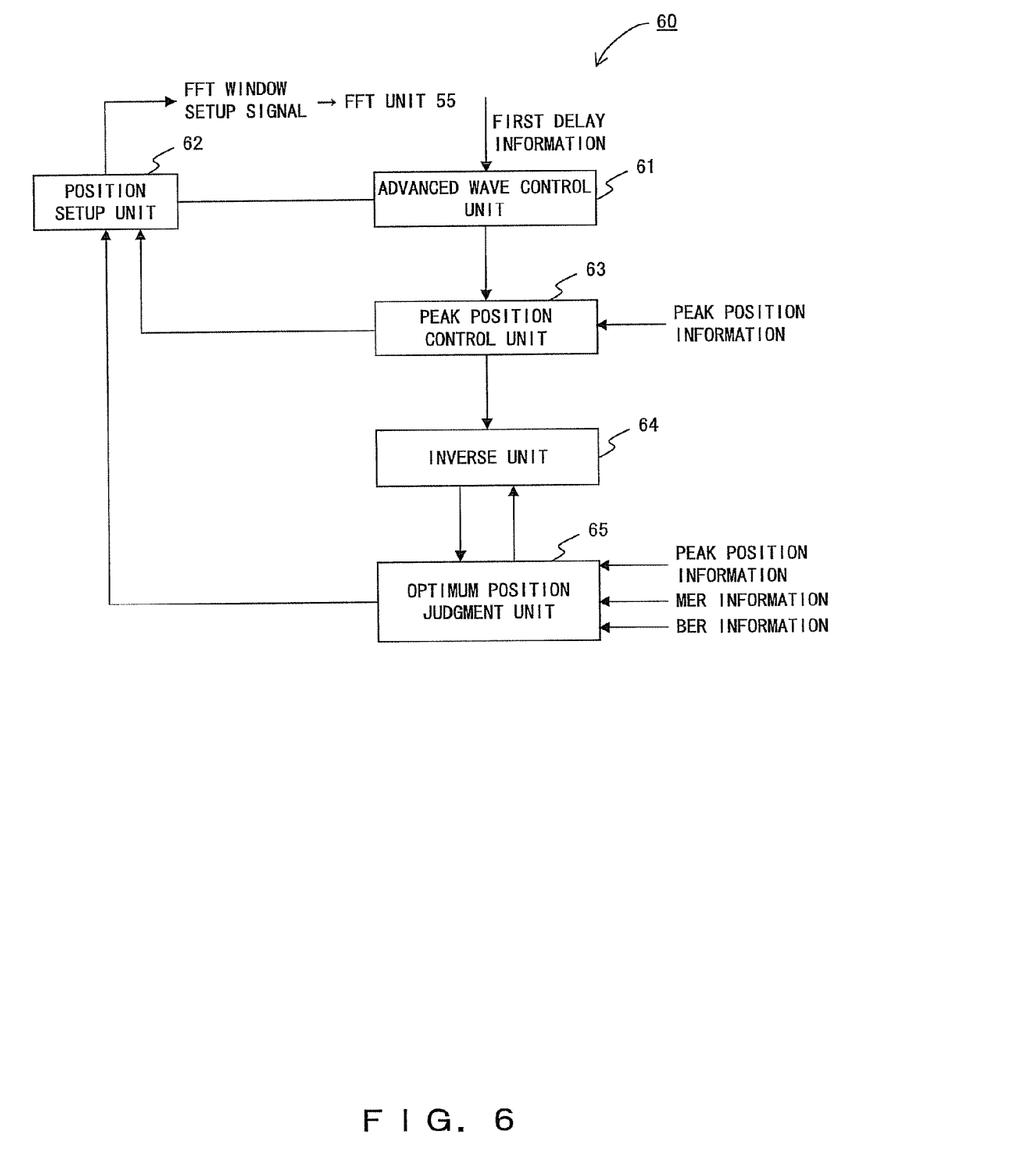
FIG. 6 shows a functional structure of an FFT window control amount judgment unit 60.

FIG. 6 shows a functional structure of the above noted FFT window control amount judgment unit 60. As shown in FIG. 6, the FFT window control amount judgment unit 60 comprises an advanced wave control unit 61, a peak position control unit 63, an inverse unit 64, an optimum position judgment unit 65 and a position setup unit 62.

The next description is of an operation thereof.

The advanced wave control unit 61 is disposed for performing an FFT window control in the case that an interference wave of a certain amount of delay or more does not exist. If the first delay information indicates the existence of an advanced wave, a control for matching the position of an FFT window with the advanced wave is carried out.

Figure 9:
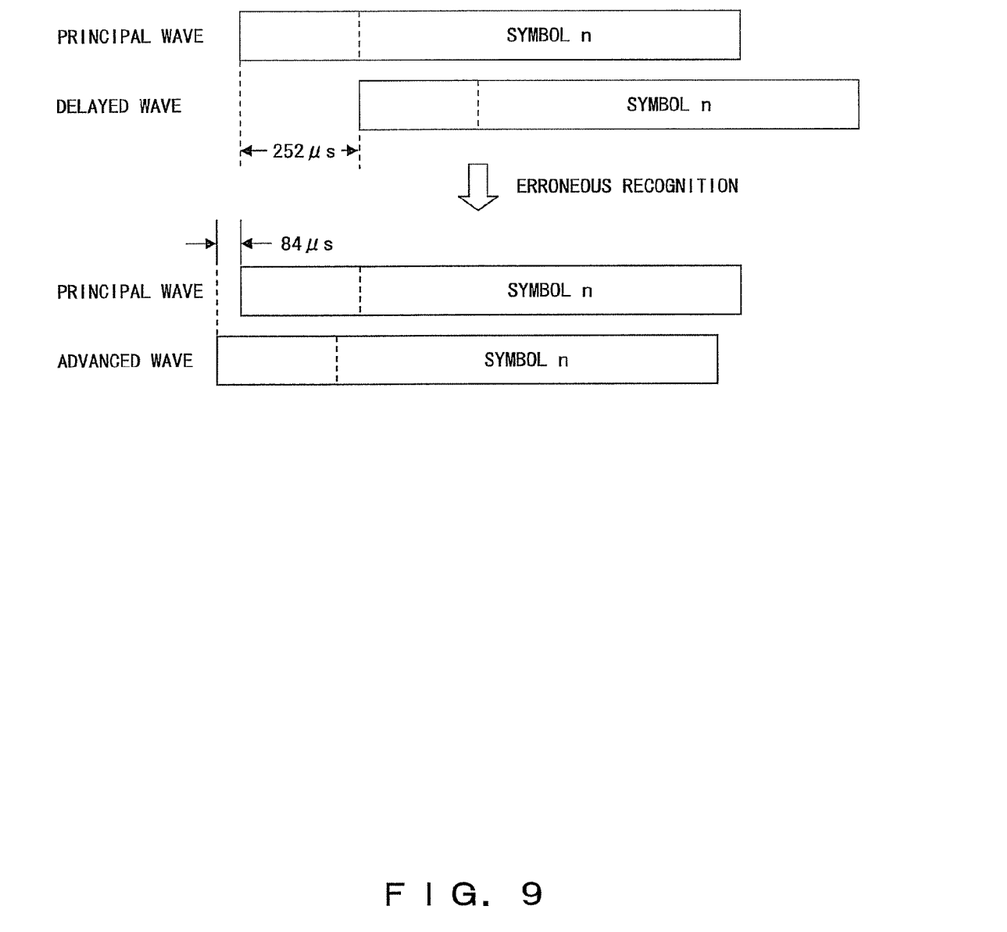
FIG. 9 shows an erroneous recognition caused by a detection of a delay amount by an SP carrier.

A delay amount targeted by the advanced wave control unit 61 depends on the maximum delay amount (i.e., an absolute value herein) to be capable of responding. For example, assuming that the maximum delay amount is 252 microsec (which corresponds to a quarter (¼) symbol length in the ISDB-T, mode 3), the delay amount results in a value (84=336−252) subtracting the aforementioned value (i.e., 252 microsec) from a third (⅓) symbol length (i.e., 336 microsec in the mode 3) which is a limit of detection by the SP carrier. This is because there is a possibility of detecting an erroneous delay amount of no more than 168 microsec and no less than 84 microsec, both ends inclusive, in the reverse direction, if a delay amount is in the range between 168 microsec and 252 microsec, both ends inclusive, as shown in FIG. 9. That is, because there is a possibility of erroneously regarding a delayed wave between 168 microsec and 252 microsec as advanced wave of no more than 168 microsec and no less than 84 microsec. An FFT window control is performed by the advanced wave control unit 61 by a delay amount within a range (i.e., between −84 microsec and +84 microsec according to the example put forth herein) precluding such a possibility of an error occurrence as described above, and therefore the control is always performed appropriately. FIG. 9 indicates the incidence of erroneously recognizing the delayed wave of 252 microsec as advanced wave of 84 microsec.

A position setup of an FFT window by an FFT window control is carried out by way of the position setup unit 62 which outputs an FFT window setup signal to the FFT unit 55 and sets the position of the FFT window. The FFT unit 55 extracts a part constituting a target of an FFT from the OFDM signal.

The peak position control unit 63 is disposed for carrying out a control on the outside of the range. In the case of the first delay information indicating a delay amount on the outside of the target range of the advanced wave control unit 61, it refers to the peak position information, judges whether the interference wave is a delayed wave or advanced wave, and confirms whether or not the first delay information is appropriate by using the judgment result.

Figure 8A:
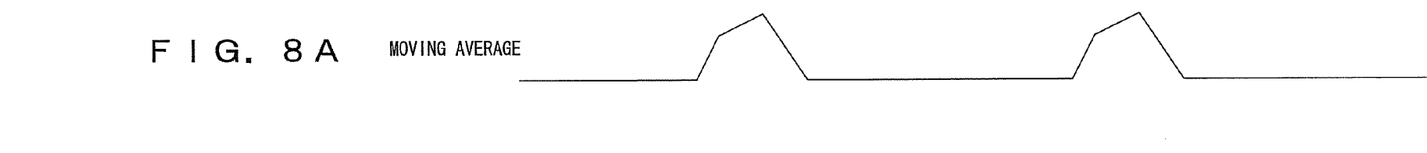
FIG. 8A shows a form expressed by peak position information in the case of a multi-path in which an advanced wave exists.
Figure 8B:
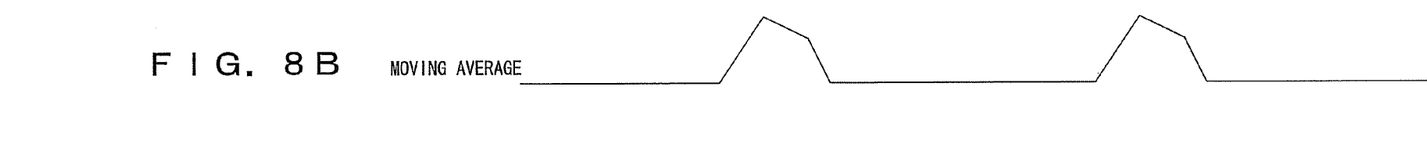
FIG. 8B shows a form expressed by peak position information in the case of a multi-path in which a delayed wave exists.

FIGS. 8A and 8B show forms expressed by peak position information, which are changed by an interference wave. FIG. 8A shows the case of a multi-path in which an advanced wave exists; and FIG. 8B shows the case of a multi-path in which a delayed wave exists.

A form expressed by peak position information (i.e., the moving average of correlation values) changes whether an interference wave is an advanced wave or delayed wave as shown in FIGS. 8A and 8B. If the interference wave is an advanced wave (refer to FIG. 2A or FIG. 2B), a range between the peak point and a point where a moving average becomes zero is longer, with the peak point being the reference, on the preceding side of the time axis as shown in FIG. 8A.

If the interference wave is a delayed wave (refer to FIG. 1B), the situation is reversed as shown in FIG. 8B. Focusing on this, the peak position control unit 63 judges whether the interference wave is an advanced wave or delayed wave and confirms whether or not the first delay information contradicts the judgment result, thereby confirming whether or not the first delay information is appropriate. If it confirms that the first delay information is inappropriate, the first delay information is outputted to the inverse unit 64, and the second delay information considered to be appropriate is made to generate. If it confirms that the first delay information is appropriate, it determines a position of the FFT window to be set from the first delay information, and sets the position of the FFT window by way of the position setup unit 62.

As shown in FIGS. 8A and 8B, a category of an interference wave can be confirmed from peak position information. Therefore, it is possible to avoid a degradation caused by an FFT window control as a result of extracting an erroneous delay amount.

In the case that a ±168 microsec is the detectable limit for an FFT window control by an SP carrier, if there is an advanced wave of 200 microsec, then an advanced wave of 200 microsec is regarded as a delayed wave of 136 microsec in terms of its characteristic, the delay information extraction unit 59 accordingly extracts the 136 microsec as the first delay information. According to these, the inverse unit 64, if the first delay information is 136 microsec, generates 200 microsec as the second delay information from the first delay information and outputs it to the optimum position judgment unit 65. Then the optimum position judgment unit 65 determines, from the second delay information generated by such an inverse process, a position of the FFT window to be set and sets the position of the FFT window by way of the position setup unit 62.

In the judgment of a category of an interference wave by peak position information, the category may possibly be judged incorrectly. Considering this, the optimum position judgment unit 65 monitors BER information and MER information and, if the reception condition is better than a certain level, judges that an advanced wave is neither erroneously recognized as a delayed wave nor erroneously recognized vice versa, and regards as a confirmation by the peak position information having been performed. Contrarily, if the BER information or the MER information indicates a bad reception condition, it regards as a possibility of an erroneous confirmation by the peak position information having been made, determines a position of the FFT window by the delay information obtainable by having the inverse unit 64 perform an inverse process on the delay information currently regarded as being valid, and sets the position thereof by way of the position setup unit 62. By this, if the delay information currently regarded as being valid indicates an advanced wave of 100 microsec, the advanced wave is regarded anew as a delayed wave of 268 microsec which has been erroneously recognized, and an FFT window control is performed for matching the FFT window with the principal wave. If being vice versa, an FFT window control is performed for matching the FFT window with an advanced wave. By so doing, the FFT window control is appropriately performed in accordance with a situation for maintaining more appropriate reception.

The optimum position judgment unit 65 confirms a reception condition by the BER information and MER information as appropriate, performs an inverse process and sets the position of an FFT window if the reception condition is bad, thereby performing an FFT window control so as to receive more adequately and optimizing the position of the FFT window.

Note that the present embodiment is configured to confirm a reception condition by BER information and MER information, the confirmation, however, may use only either one of them. And that an inverse process by the optimum position judgment unit 65 may be carried out under the condition of a passage of a certain period of time because it accompanies a temporary degradation.

What is claimed is:

1. An Orthogonal Frequency Division Multiplexing (OFDM) receiver for receiving an OFDM signal transmitted by an OFDM system, comprising:
   a Fourier transform circuit configured to perform a Fourier transform on OFDM signals of time domain which have been received and demodulated via an orthogonal demodulation and to output OFDM signals of frequency domain;
   a delay amount detection unit configured to detect a first delay amount from a first OFDM signal to a second OFDM signal based on scattered pilot information included in the first and second OFDM signals, the first and second OFDM signals being signals of the time domain and obtained from the OFDM signals of frequency domain received from transmission paths of different frequency domains; and
   a window control unit configured to judge whether the first delay amount is within a range precluding a possibility of an error occurrence of erroneously recognizing a delayed wave of the OFDM signal of the time domain as an advanced wave of another OFDM signal of the time domain based on error information obtained from the OFDM signal of frequency domain, and peak position information obtained from the OFDM signals of the time domain of preceding and following symbols, and configured to calculate a second delay amount of the first OFDM signal in relation to the second OFDM signal when the first delay amount is not within the range, the window control unit being configured to set a position of a time window indicating a range within which the Fourier transform is to be performed on the OFDM signal by the Fourier transform circuit by using the first delay amount when the first delay amount is within the range, or the second delay amount when the first delay amount is not within the range.

2. The OFDM receiver according to claim 1, wherein the window control unit judges whether the first delay amount is appropriate when an absolute value of the first delay amount is outside of a predefined range.

3. The OFDM receiver according to claim 1, wherein a transform result by the Fourier transform circuit are Modulation Error Rate (MER) information from a transmission equalization unit connected to the Fourier transform circuit and Bit Error Rate (BER) information from an error correction unit connected to the transmission equalization unit.

4. A window control apparatus equipped on an Orthogonal Frequency Division Multiplexing (OFDM) receiver, which receives an OFDM signal transmitted by an OFDM system, in order to control a position of a time window indicating a part constituting a target of a Fourier transform within OFDM signals of time domain which have been received and demodulated via an orthogonal demodulation, comprising:
   a delay information obtainment unit configured to obtain first delay information indicating a first delay amount from a first OFDM signal to a second OFDM signal, which is detected based on scattered pilot information included in the first and second OFDM signals, the first and second OFDM signals being signals of the time domain and obtained from the OFDM signals of frequency domain received from transmission paths of the different frequency domains;

a position information obtainment unit configured to at least obtain peak position information obtainable from the OFDM signals of the time domain of preceding and following symbols; and a window control unit configured to judge whether the first delay amount is within a range precluding a possibility of an error occurrence of erroneously recognizing a delayed wave of the OFDM signal of the time domain as an advanced wave of another OFDM signal of the time domain based on error information obtained from peak position information obtained by the position information obtainment unit, and configured to calculate a second delay amount of the first OFDM signal in relation to the second OFDM signal when the first delay amount is not within the range, the window control unit being configured to set a position of a time window indicating a range within which the Fourier transform is to be performed on the OFDM signal by using the first delay amount when the first delay amount is judged to be within the range, or the second delay amount when the first delay amount is not within the range.

5. The window control apparatus according to claim 4, wherein the window control unit judges whether the first delay amount is appropriate when an absolute value of the first delay amount is outside of a predefined range.

6. The window control apparatus according to claim 4, wherein the window control unit judges whether the first delay amount is appropriate using three kinds of information, i.e., the peak position information obtained by the position information obtainment unit, Modulation Error Rate (MER) information from a transmission path equalization unit connected to the Fourier transform circuit and Bit Error Rate (BER) information from a correction unit connected to the transmission path equalization unit, and calculates the second delay amount when the first delay amount is judged to be inappropriate.

7. A window control method, which is a method for use in an Orthogonal Frequency Division Multiplexing (OFDM) receiver that receives an OFDM signal transmitted by an OFDM system, for controlling a position of a time window indicating a part constituting a target of a Fourier transform within OFDM signals of time domain which have been received and demodulated via an orthogonal demodulation, comprising:

obtaining, by using the OFDM receiver, first delay information indicating a first delay amount from a first OFDM signal to a second OFDM signal detected based on scattered pilot information included in the first and second OFDM signals, the first and second OFDM signals being signals of the time domain and obtained from the OFDM signals of frequency domain received from transmission paths of different frequency domains;

at least obtaining, by using the OFDM receiver, peak position information obtainable from the OFDM signals of the time domain of preceding and following symbols;

judging, by using the OFDM receiver, whether the first delay amount is within a range precluding a possibility of an error occurrence of erroneously recognizing a delayed wave of the OFDM signal of the time domain as an advanced wave of another OFDM signal of the time domain based on error information obtained from the peak position information, and calculating a second delay amount of the first OFDM in relation to the second OFDM signal when the first delay amount is not within the range; and setting, by using the OFDM receiver, a position of a time window indicating a range within which the Fourier transform is to be performed on the OFDM signal by using the first delay amount when the first delay amount is judged to be within the range, or the second delay amount when the first delay amount is not within the range.

8. The window control method according to claim 7, wherein judging whether the first delay amount is appropriate when an absolute value of the first delay amount is outside of a predefined range.

9. The window control method according to claim 7, further comprising:

judging whether the first delay amount is appropriate using three kinds of information, i.e., the peak position information, Modulation Error Rate (MER) information from a transmission path equalization unit connected to a Fourier transform circuit and Bit Error Rate (BER) information from a correction unit connected to the transmission path equalization unit, and calculating the second delay amount when the first delay amount is judged to be inappropriate.

10. The OFDM receiver according to claim 2, wherein a transmission equalization unit, connected to the Fourier transform circuit, outputs Modulation Error Rate (MER) information to the window control unit.

11. The OFDM receiver according to claim 10, wherein an error correction unit, connected to the transmission equalization unit, outputs Bit Error Rate (BER) information to the window control unit.

12. The OFDM receiver according to claim 2, wherein an error correction unit outputs Bit Error Rate (BER) information to the window control unit.

13. The OFDM receiver according to claim 1, wherein the window control unit sets the position of the time window using the second delay amount obtained from the first delay amount which is not within the range.

14. The OFDM receiver according to claim 13, wherein the range of the window control unit is ±168 microseconds.

15. The OFDM receiver according to claim 1, wherein the range of the window control unit is ±168 microseconds.

* * * * *

UNITED STATES PATENT AND TRADEMARK OFFICE
CERTIFICATE OF CORRECTION

PATENT NO. : 8,358,710 B2
APPLICATION NO. : 11/554869
DATED : January 22, 2013
INVENTOR(S) : Naoto Adachi Page 1 of 1

It is certified that error appears in the above-identified patent and that said Letters Patent is hereby corrected as shown below:

In the Claims:

Column 10, Line 44, In Claim 1, after "is" insert -- judged to be --.

Signed and Sealed this
Twenty-first Day of May, 2013

Teresa Stanek Rea
*Acting Director of the United States Patent and Trademark Office*